(12) United States Patent
Oh

(10) Patent No.: US 11,906,848 B1
(45) Date of Patent: Feb. 20, 2024

(54) DISPLAY WITH AN INTERACTIVE SEMI-INTEGRATED GUIDE PANEL

(71) Applicant: DELL PRODUCTS L.P., Round Rock, TX (US)

(72) Inventor: Guentaek Oh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/299,337

(22) Filed: Apr. 12, 2023

(51) Int. Cl.
*G02F 1/13357* (2006.01)
*G02F 1/1335* (2006.01)
*G02F 1/1333* (2006.01)

(52) U.S. Cl.
CPC .. *G02F 1/133615* (2013.01); *G02F 1/133308* (2013.01); *G02F 1/133524* (2013.01)

(58) Field of Classification Search
None
See application file for complete search history.

(56) References Cited

U.S. PATENT DOCUMENTS

| | | | |
|---|---|---|---|
| 2017/0108734 A1* | 4/2017 | Oh | G02B 6/0088 |
| 2017/0148393 A1 | 5/2017 | Peana | |
| 2021/0041085 A1* | 2/2021 | Oh | F21V 7/0008 |

* cited by examiner

*Primary Examiner* — Phu Vu
(74) *Attorney, Agent, or Firm* — Larson Newman, LLP

(57) ABSTRACT

A display for an information handling system includes a display panel, a semi-integrated guide panel, an integrated rear cover, and an optical cable. The semi-integrated guide panel is coupled to a back surface of the display panel. The integrated rear cover is in physical communication with the semi-integrated guide panel. The optical cable is in physical communication with and located in between the semi-integrated guide panel and the integrated rear cover. The optical cable provides one of a plurality of colors based on a determined condition.

20 Claims, 4 Drawing Sheets

US 11,906,848 B1

DISPLAY WITH AN INTERACTIVE SEMI-INTEGRATED GUIDE PANEL

FIELD OF THE DISCLOSURE

The present disclosure generally relates to information handling systems, and more particularly relates to a display with an interactive semi-integrated guide panel.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display for an information handling system includes a display panel, a semi-integrated guide panel, an integrated rear cover, and an optical cable. The semi-integrated guide panel may be coupled to a back surface of the display panel. The integrated rear cover may be in physical communication with the semi-integrated guide panel. The optical cable may be in physical communication with and located in between the semi-integrated guide panel and the integrated rear cover. The optical cable may provide one of a plurality of colors based on a determined condition.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
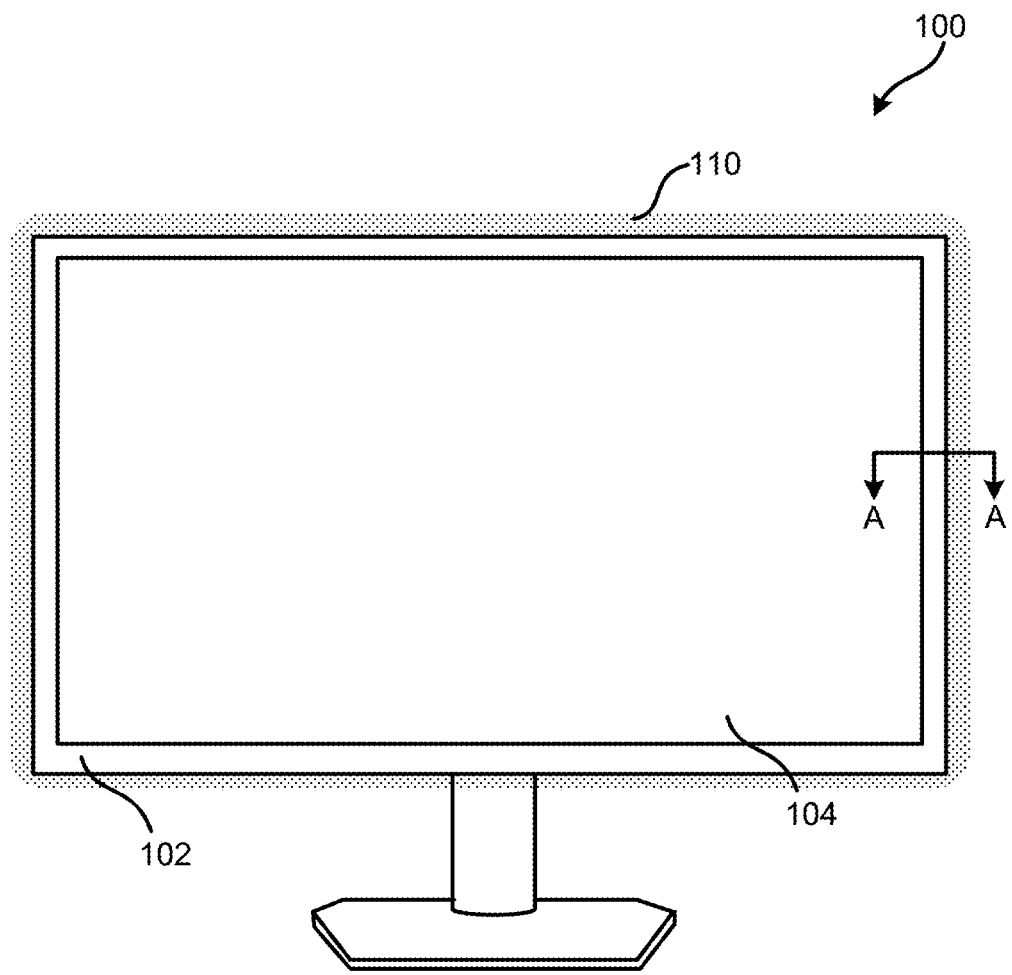
FIGS. 1 and 2 are diagrams of a display of an information handling system according to at least one embodiment of the present disclosure.
Figure 2:
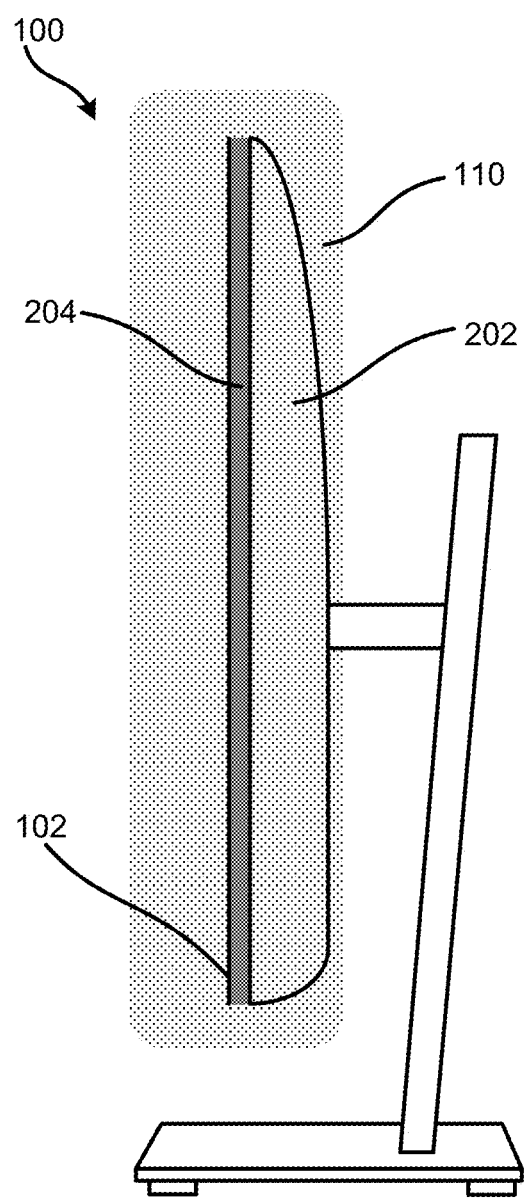
Figure 3:
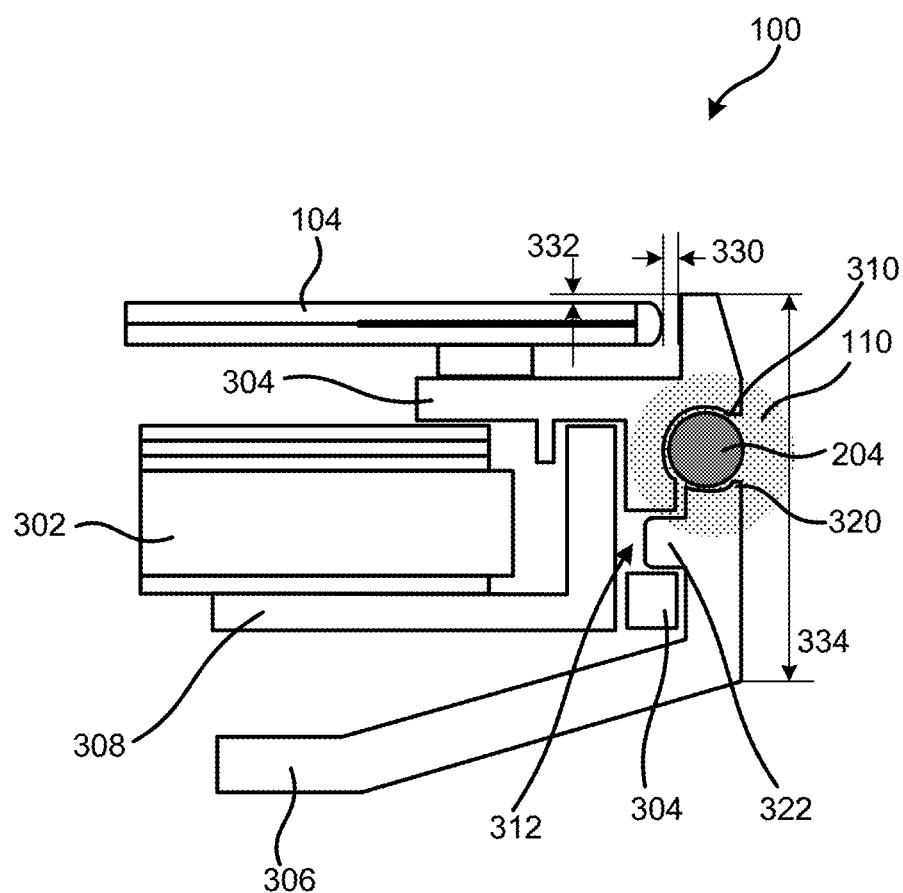
FIG. 3 is a cross-sectional view of a portion of a display with a semi-integrated guide panel according to at least one embodiment of the present disclosure.
Figure 4:
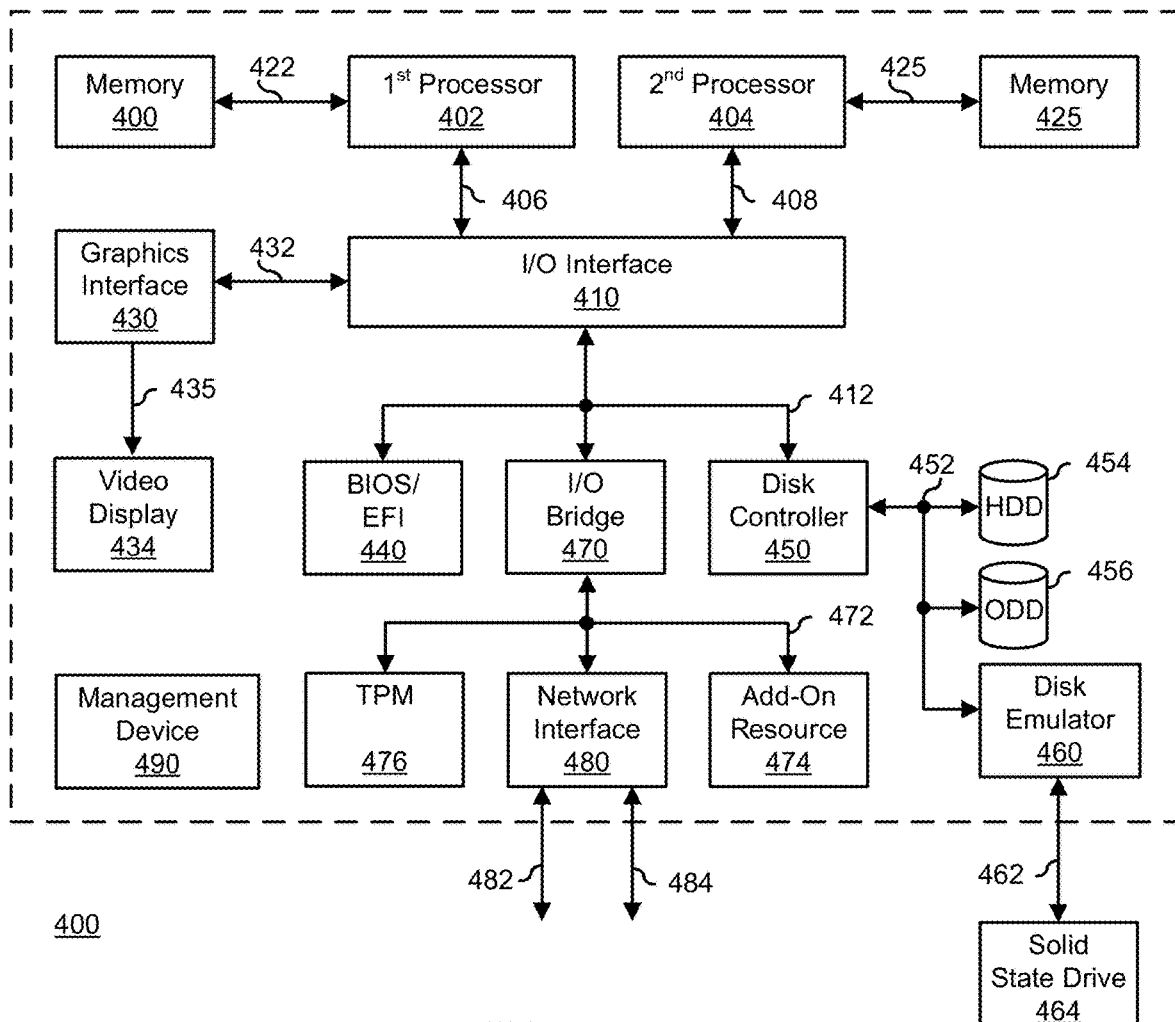
FIG. 4 is a block diagram of a general information handling system according to an embodiment of the present disclosure.

FIGS. 1-3 illustrate diagrams of a display 100 of an information handling system, such as information handling system 400 of FIG. 4, according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Display 100 includes a front panel 102 and a display panel 104. Display 100 includes an optical cable, such as optical cable 204 in FIGS. 2 and 3. Optical cable 204 may be any suitable optical component, such as an optical fiber, that may transmit light from different color light emitting diodes (LEDs). In an example, display 100 may be an 'all-in-one' system, such that the display may include the components to display images, and the components to perform operations of an information handling system, such as information handling system 400 of FIG. 4. In an example, display 100 may include additional components without varying from the scope of this disclosure. A portion of display 100 taken along line A-A will be described with respect to FIG. 3 below.

In an example, optical cable 204 may produce different colors based on conditions within an information handling system, such as information handling system 400 of FIG. 4, associated with display 100. In an example, a processor, such as processor 402 in FIG. 4, may perform one or more operations, be in a particular operating mode, or the like. Based on a current operation or condition, optical cable 204 may provide a particular light 110 from the edges of panel 102.

Referring now to FIG. 2, optical cable 204 may be located within display 100 between front panel 102 and a rear cover 202 of the display. In an example, the operations of processor 402 may be any suitable operations for which an interactive light may enhance the experience of an individual associated with display 100. For example, if display 100 is utilized for video conferencing, optical cable 204 may produce one or more colors to show a status of a meeting. In this example, optical cable 204 may provide a first color to indicate that the individual is in a meeting, a second color to indicate that the information handling system is ready for a meeting, a third color to indicate that no meeting is schedule, or the like.

In an example, optical cable 204 may flicker light with particular colors to indicate that a specific type of message has been received by processor 402 in FIG. 4. Optical cable 204 may be utilized to provide different lights associated with actions in a gaming operation of the information handling system associated with display 100. In an example, optical cable 204 may provide lighting when display 100 is used inside a room, office, or the like. In certain examples, if display 100 is used as a public display for advertising or the like, optical cable 204 may provide lights to capture the attention of individuals.

FIG. 3 illustrates a cross section of display 100 taken along line A-A of FIG. 1 according to at least one embodiment of the present disclosure. As shown in FIG. 3, display 100 includes a light guide plate (LGP) 302, a semi-integrated guide panel 304, an integrated rear cover 306, and a cover bottom 308. Semi-integrated guide panel 304 includes a hook 310 and a notch portion 312. Integrated rear cover 306 includes a hook 320 and an insert portion 322. In an example, semi-integrated guide panel 304 may be coupled to a back surface of display panel 100, and include a portion that extends past a front surface of the display panel. In this example, the portion of semi-integrated guide panel 304 that extends beyond the front surface of display panel 104 may be panel 102 of FIGS. 1 and 2. In an example, display 100 may include additional components without varying from the scope of this disclosure.

In an example, LGP 302 may direct light from LEDs within display 100. In certain examples, the directed light within LGP 302 may be utilized in displaying images on display panel 104. In certain examples, semi-integrated guide panel 304 may be an integrated component that is the guide panel and a portion of a middle frame of previous displays. Semi-integrated guide panel 304 may limit a need for a middle frame to connect rear cover 306 and cover bottom 308 to a guide panel. Based on semi-integrated guide panel 304 holding display panel 104 in place, a distance 330 between the display panel and the portion of the semi-integrated guide panel may be decreased as compared to previous displays. Distance 330 may be any suitable length, such as less than 0.3 mm. In an example, the small distance 330 may prevent dust and other debris from collecting in between display panel 104 and semi-integrated guide panel 304 and may provide a high quality display 100.

In an example, semi-integrated guide panel 304 may enable a step distance 332 from a front edge of the semi-integrated guide panel and the front surface of display panel 104 to be minimized as compared to previous displays. For example, step distance 332 may be any suitable distance including, but not limited to, a distance less than 0.3 mm. In certain examples, a middle frame of previous displays may be integrated into semi-integrated guide panel 304 and integrated rear cover 306. Based on this integration, a thickness 334 of display 100 may be slimmer as compared to previous displays. In an example, thickness 334 may be any suitable distance including, but not limited to, a distance less than 8 mm.

In certain examples, semi-integrated guide panel 304 may be securely connected with integrated rear cover 306 in any suitable manner. For example, insert portion 322 of integrated rear cover 306 may snap fit within notch portion 312 of semi-integrated guide panel 304. The snap fitting may hold semi-integrated guide panel 304 in physical communication with integrated rear cover 306. In an example, optical cable 204 may be held between semi-integrated guide panel 304 and integrated rear cover 306 to provide an interactive component to display 100.

After display 100 has been assembled, hooks 310 and 320 may securely hold optical cable 204 within the display, such as between semi-integrated guide panel 304 and integrated rear cover 306. In an example, optical cable 204 may provide a local projection 110 on a portion of semi-integrated guide panel 304 and a portion of integrated rear cover 306. In certain examples, projection 110 may be controlled and utilized as described above to provide an interactive experience for a user of display 100.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 3394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A display for an information handling system, the display comprising:
   a display panel;
   a semi-integrated guide panel coupled to a back surface of the display panel;
   an integrated rear cover in physical communication with the semi-integrated guide panel; and
   an optical cable in physical communication with and located in between the semi-integrated guide panel and the integrated rear cover, the optical cable to provide one of a plurality of colors based on a determined condition.

2. The display of claim 1, further comprising a front panel, the front panel includes:
   a light guide plate in physical communication with the semi-integrated guide panel, the light guide plate to direct light within the display.

3. The display of claim 2, further comprising a bottom cover in physical communication with the semi-integrated guide panel and the light guide plate, the bottom cover to hold the light guide plate in physical communication with the semi-integrated guide panel.

4. The display of claim 1, wherein the semi-integrated guide panel includes a first hook portion to hold the optical cable in between the semi-integrated guide panel and the integrated rear cover.

5. The display of claim 4, wherein the integrated rear cover includes a second hook portion to hold the optical cable in between the semi-integrated guide panel and the integrated rear cover.

6. The display of claim 1, wherein the optical cable provides a first local projection on a first edge of the semi-integrated guide panel, and provides a second local projection on a second edge of the integrated rear cover.

7. The display of claim 1, wherein the optical cable is a multiple color fiber optical cable.

8. The display of claim 1, wherein the condition is an operating mode of an information handling system associated with the display.

9. A display for an information handling system, the display comprising:
   a display panel;
   a semi-integrated guide panel coupled to a back surface of the display panel, the semi-integrated guide panel including a notch portion;
   an integrated rear cover in physical communication with the semi-integrated guide panel, the integrated rear cover including a tab portion to be inserted into the notch portion, wherein the insertion of tab portion in the notch portion holds the integrated rear cover in physical communication with the semi-integrated guide panel; and
   an optical cable in physical communication with and located between the semi-integrated guide panel and the integrated rear cover, the optical cable to provide one of a plurality of colors based on a determined condition.

10. The display of claim 9, further comprising a front panel that includes a light guide plate in physical communication with the semi-integrated guide panel, the light guide plate to direct light within the display.

11. The display of claim 10, further comprising a bottom cover in physical communication with the semi-integrated guide panel and the light guide plate, the bottom cover to hold the light guide plate in physical communication with the semi-integrated guide panel.

12. The display of claim 9, wherein the semi-integrated guide panel includes a first hook portion to hold the optical cable in between the semi-integrated guide panel and the integrated rear cover.

13. The display of claim 12, wherein the integrated rear cover includes a second hook portion to hold the optical cable in between the semi-integrated guide panel and the integrated rear cover.

14. The display of claim 9, wherein the optical cable provides a first local projection on a first edge of the semi-integrated guide panel and provides a second local projection on a second edge of the integrated rear cover.

15. The display of claim 9, wherein the optical cable is a multiple color fiber optical cable.

16. The display of claim 9, wherein the condition is an operating mode of an information handling system associated with the display.

17. An information handling system comprising:
    a processor; and
    a display including:
      a display panel;
      a semi-integrated guide panel coupled to a back surface of the display panel, the semi-integrated guide panel including a notch portion;
      an integrated rear cover in physical communication with the semi-integrated guide panel, the integrated rear cover including a tab portion to be inserted into the notch portion, wherein the insertion of tab portion in the notch portion holds the integrated rear cover in physical communication with the semi-integrated guide panel; and
      an optical cable in physical communication with and located in between the semi-integrated guide panel and the integrated rear cover, the optical cable to provide one of a plurality of colors based on operating mode of the processor.

18. The information handling system of claim 17, wherein the semi-integrated guide panel includes a first hook portion to hold the optical cable in between the semi-integrated guide panel and the integrated rear cover.

19. The information handling system of claim 17, wherein the integrated rear cover includes a second hook portion to hold the optical cable in between the semi-integrated guide panel and the integrated rear cover.

20. The information handling system of claim 17, wherein the optical cable provides a first local projection on a first edge of the semi-integrated guide panel and provides a second local projection on a second edge of the integrated rear cover.

* * * * *